Bruce C. Wells,
Inventor

Patented June 20, 1933

1,914,657

UNITED STATES PATENT OFFICE

BRUCE C. WELLS, OF LOUISVILLE, KENTUCKY

INSULATOR BRACKET

Application filed May 31, 1932. Serial No. 614,513.

The invention relates to improvements in insulator brackets in which an insulator for insulating aerial wires is supported by a bracket; and the objects of the improvements are, first, to provide an insulator bracket that could be readily attached to fastenings such as eye-bolts, screw-eyes (screws with eye openings), drill holes in metal work, etc., and second, to provide in the design of a bracket a mechanical feature that will permit the use of a comparatively small bracket for a given service.

Figure 1:
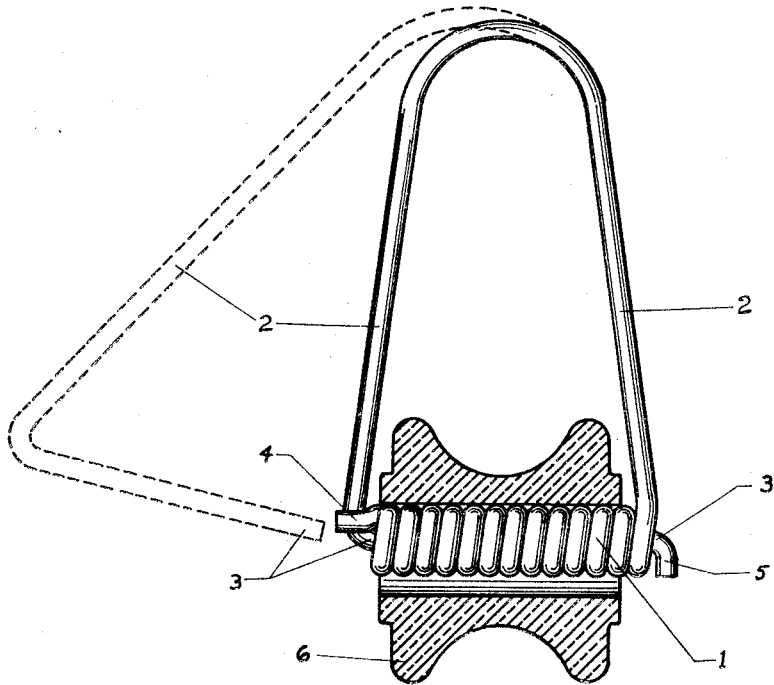
Figure 2:
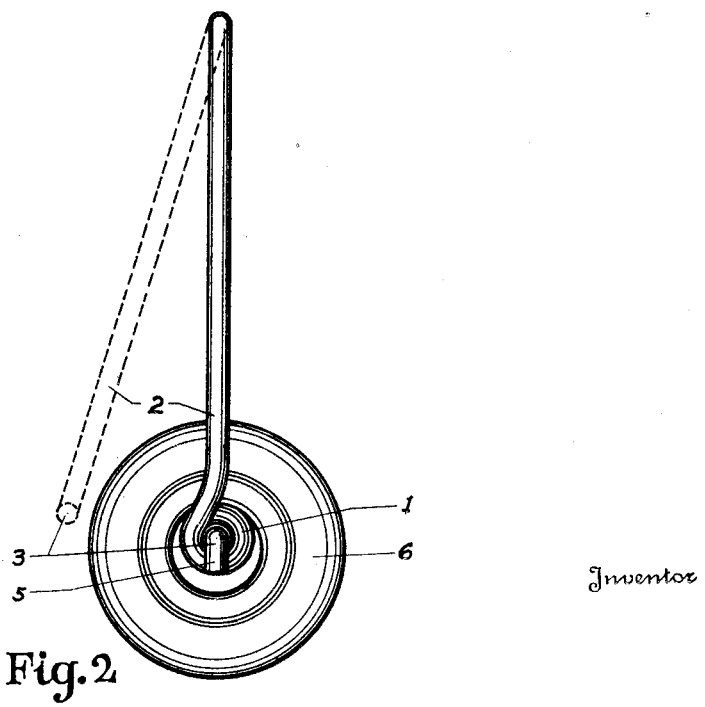

One form of the invention is illustrated in the accompanying drawing in which Figure 1 is a side view of the entire bracket showing an insulator in section, Figure 2 shows a side view of the entire bracket at right-angles to the view shown in Figure 1 except the insulator is not shown in section. The broken lines indicate the position of the bail 2 and the pin 3 when the bracket is being assembled or when said bracket is being attached to a fastening.

The bracket is composed of a cylindrical coil bushing 1 which is formed by winding a wire on a mandrel to make a bearing support for an insulator 6; a bail 2 for supporting a coil bushing 1 and insulator 6 and a pin 3 which is a continuation of the bail 2 and which works inside of coil bushing 1, also, a projection 4 on the coil bushing 1 that engages the bail 2 which prevents the coil bushing 1 from unwinding when under load condition. The pin 3 is bent as shown at 5 to form a lock for the bracket.

The cylindrical coil bushing 1, bail 2, pin 3 and the projection 4 is one continuous wire.

The said insulator bracket is adapted for use in supporting telephone drops, radio aerials or electric service conductors when used in connection with suitable fastenings.

I am aware that prior to my invention insulator brackets, wire holders, etc., have been made that used wire bails for carrying insulators, etc. I therefore do not claim such as my inventaion broadly; but

I claim:

The combination in an insulator bracket of a cylindrical coil bushing carrying an insulator, a bail which is a continuation of the material from which said coil bushing is made and a pin which is a continuation of said bail and which works inside of said coil bushing.

BRUCE C. WELLS.